US006816434B2

(12) United States Patent
Jones

(10) Patent No.: US 6,816,434 B2
(45) Date of Patent: Nov. 9, 2004

(54) SEISMIC DETECTION

(75) Inventor: Robert Hughes Jones, Falmouth (GB)

(73) Assignee: ABB Offshore Systems Ltd. (GB)

( * ) Notice: Subject to any disclaimer, the term of this patent is extended or adjusted under 35 U.S.C. 154(b) by 0 days.

(21) Appl. No.: 10/079,219

(22) Filed: Feb. 19, 2002

(65) Prior Publication Data

US 2002/0152031 A1 Oct. 17, 2002

(30) Foreign Application Priority Data

Feb. 26, 2001 (GB) ................................ 0101744

(51) Int. Cl.$^7$ .......................... G01V 1/18; G01V 13/00
(52) U.S. Cl. ............................................ 367/13; 73/1.85
(58) Field of Search ........................... 367/13; 73/1.82, 73/1.85; 181/401

(56) References Cited

U.S. PATENT DOCUMENTS

| | | | | |
|---|---|---|---|---|
| 2,695,395 A | * | 11/1954 | Montgomery ................. | 367/13 |
| 3,731,269 A | * | 5/1973 | Judson et al. ................. | 367/54 |
| 3,930,216 A | * | 12/1975 | Hall, Jr. ........................ | 367/13 |
| 4,003,018 A | * | 1/1977 | McCormick ................. | 73/1.85 |
| 4,043,175 A | * | 8/1977 | Fredriksson et al. ......... | 367/13 |
| 4,298,969 A | * | 11/1981 | Rickenbacker .............. | 73/1.85 |
| 4,300,220 A | * | 11/1981 | Goff et al. ................... | 367/188 |
| 4,656,615 A | * | 4/1987 | Grice ........................... | 367/13 |
| 4,791,617 A | | 12/1988 | Seymour ..................... | 367/171 |
| 4,839,872 A | * | 6/1989 | Gragnolati et al. .......... | 181/122 |
| 5,113,375 A | * | 5/1992 | Jones, Jr. ..................... | 367/13 |
| 5,121,362 A | * | 6/1992 | Bednar ........................ | 367/13 |
| 5,435,178 A | | 7/1995 | Edwards | |
| 6,512,980 B1 | * | 1/2003 | Barr ............................. | 702/1 |
| 6,612,398 B1 | * | 9/2003 | Tokimatsu et al. .......... | 181/122 |
| 2002/0011378 A1 | | 1/2002 | Bailey | |

FOREIGN PATENT DOCUMENTS

| | | |
|---|---|---|
| DE | 266183 | 9/1982 |
| GB | 2275337 | 8/1994 |
| WO | WO 01/99028 | 12/2001 |

* cited by examiner

*Primary Examiner*—Ian J. Lobo
(74) *Attorney, Agent, or Firm*—Barnes & Thornburg

(57) ABSTRACT

A method of using a seismic detector including four seismic sensors having axes which are in a substantially tetrahedral configuration, each of the sensors being in a respective signal channel, includes one or more of the following steps: combining outputs from the sensors to check that their polarities are correct; testing to ascertain if one of the sensors is not working and, if so, using the outputs from the other three sensors to obtain an indication of motion in three dimensions; if all four sensors are working, using their outputs to obtain an indication of motion in three dimensions on a least squares basis; checking that the outputs from the sensors are coherent; and checking the gains (or sensitivities) of the four channels.

2 Claims, 6 Drawing Sheets

SEISMIC DETECTION

BACKGROUND OF THE INVENTION

(1) Field of the Invention

The present invention relates to seismic detection, for example to seismic detection carried out down a bore-hole to detect and measure seismic activity as represented by particle velocity or particle acceleration.

(2) Description of Related Art

It is already known to use, for such purposes, seismic detectors which have sensors oriented along three axes preferably at right angles to one another.

However, in such a detector, using three axial sensors, if one sensor (or the electronics associated with it) should fail, then the resulting two-component detector cannot give a representation of the three-dimensional movement which it is attempting to measure. Only a two-dimensional projection of this three-dimensional motion on to a plane can then be measured.

Also, the margin of error in such a three-axis detector is considerable since the 'error inflation factor' (i.e. the relationship between the error propagated from the measurement to the final estimate) is substantially 1 for each axis of a three-component system which means that for such a system the errors are compounded in the final estimates.

Moreover, there is no scope for cross-checking in such a three-axis detector. GB-A- 2 275 337 describes a seismic detector comprising a sonde which includes a configuration of four sensors (typically accelerometers or geophones) mounted in an equi-angular tetrahedral configuration with respect to one another to deal with the above problems. The four-sensor arrangement provides for some redundancy in the system such that the failure of one sensor still allows particle motion to be reconstructed in three dimensions (3D) and furthermore some form of error determination can be made, neither of which can be effected by the conventional three-sensor system. However, there is no disclosure of the processing required to realise these advantages, nor the processing required to extract the required seismic information from the configuration.

BRIEF SUMMARY OF THE INVENTION

According to the present invention, there is provided, a method of using a seismic detector including four seismic sensors having axes which are in a substantially tetrahedral configuration, each of the sensors being in a respective signal channel, the method including one or more of the following steps:

a) combining outputs from the sensors to check that their polarities are correct;

b) testing to ascertain if one of the sensors is not working and, if so, using the outputs from the other three sensors;

c) if all four sensors are working, using their outputs to obtain an indication of motion in three dimensions on a least squares basis;

d) checking that the outputs from the sensors are coherent; and e) checking the gains (or sensitivities) of the four channels.

DETAILED DESCRIPTION OF THE INVENTION

Figure 1:
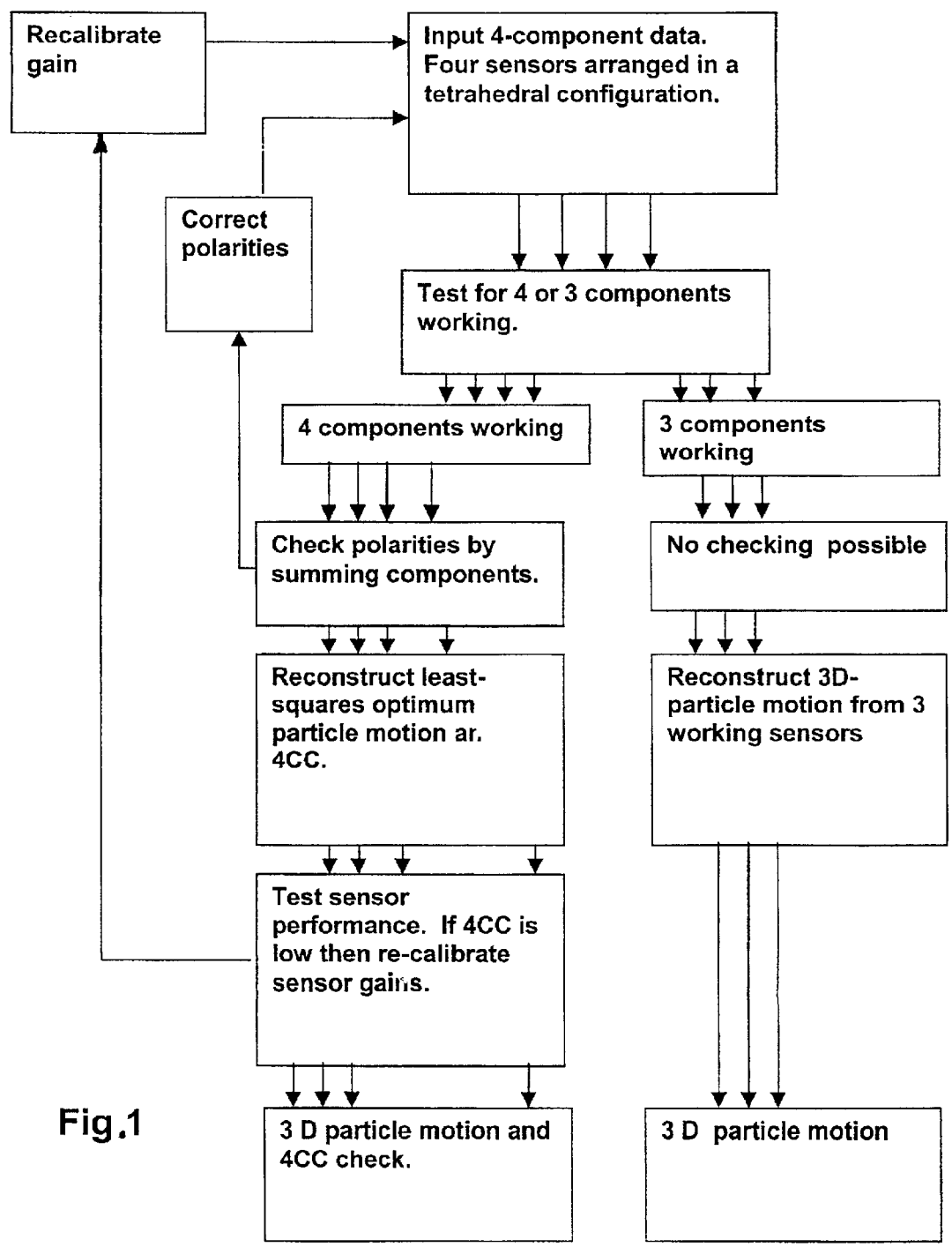
FIG. 1 is a flow chart diagrammatically showing the steps of the present inventive method.

There will now be described an example of the present invention, namely the processing steps using a seismic detector including four tetrahedrally arranged sensors, each sensor being in a respective signal channel which could include an amplifier receiving the sensor's ouput. It should be noted that the conventional orthogonal sensor arrangement does not allow any of these processing steps. The processing steps include one or more of the following steps.

1. Simple Polarity Checks

As there are more components than unknowns, combining them allows checking that the polarities of the sensors are correct. This is simply done by adding the outputs from the four sensors. When all the sensors are working correctly, the four outputs will add to zero because of the geometry of the sensors. This process cannot be applied in a conventional three-sensor configuration because, by definition, if sensors are orthogonal, then no cross-checking can be performed.

2. Single Component Failure

If any one of the sensors, fails it is possible to still reconstruct the full 3D-particle motion with around 80% of the reliability of a three-sensor orthogonal set. This is possible because the three remaining sensors still span the three dimensions, although they do not do so as efficiently as three orthogonally arranged sensors.

3. Least Squares Optimum 3D Particle Motion

The four-sensor configuration is over-determined. This means that there are more measurements than there are unknowns. The three-sensor orthogonal arrangement is an even-determined system, as there are the same number of readings as unknowns. For the four-sensor configuration, a "least squares" estimate of each reading can be formed. This is more accurate than just the single estimate that a 3-sensor system allows.

4. Four Component Coherency

For each time sample four readings are made for three unknowns, which means that it is over-determined, i.e. four data points and three unknowns. By making a least squares estimate of the signal values, a type of root mean square (rms) is formed for the signal misfit. The normalised misfit is termed the four-component coherence (4CC). When all the sensors are working correctly and a signal, which is large compared to the system's noise, is measured then the 4CC, or normalised rms, will tend to zero. This allows the system to be checked and can also be used to measure the onset of transient signals.

When no signal is present, but only incoherent noise, then the normalised rms is large. When a signal arrives, the four sensors give a coherent signal and the normalised rms becomes very small. As the signal fades back towards the level of the background noise, the normalised rms increases and so can be used as an objective measure of signal to noise. The 4CC allows checking that all the sensors are functioning properly and so a quality check of the data on a sample-by-sample basis.

5. Gain Recovery

If the gain of one or more of the sensor channels has changed over time, it is possible to regain a least squares best estimate of the gains and so adjust the gains over time. As described above, the simple summing of the channels will, in the presence of a coherent signal, give an answer of zero. This process can be repeated for many samples and a set of simultaneous equations constructed where the unknowns are the relative gains of the four channels. There are two possible solutions of such a set of equations. The first solution, which always exists, is that all the gains are zero. If this is the only solution that exists, then this is interpreted as meaning that the gains are changing rapidly with time, i.e. the sensors and/or their amplifiers are not working correctly. The second solution gives the best least squares estimate of the relative gains of the channels. This estimate can then be used to reset the relative gains of the channels if they are found to have drifted 1 over time.

The above processing is shown diagrammatically as a flow chart in FIG. 1.

The mathematics typically required to effect the processing steps above is described as follows.

In the interests of clarity, some simplifications have been made. Firstly, as it is the configuration of the sensors rather than their response functions that is being analysed, it is assumed that they have perfect impulse responses. The reference frame is defined such that the axes are aligned with the sensors. In the case of the four-sensor tetrahedral configuration, a first sensor is aligned with the z-axis, a second is aligned in the x=0 plane and the remaining two sensors are arranged so that all the sensors have equal angles between them. The configuration may be as in GB-A- 2 275 337.

The recording situation for an orthogonal three-sensor detector can be written as:

$$\begin{vmatrix} Xr \\ Yr \\ Zr \end{vmatrix} = \begin{vmatrix} Xo \\ Yo \\ Zo \end{vmatrix} \quad (1)$$

where Xr, Yr and Zr are the positional values of the particle motion in the earth and Xo, Yo and Zo are the positional values of the particle motion of the observed on the X, Y and Z sensors respectively. Equation (1) shows the recording situation as it is normally assumed to exist. More explicitly this may be written out as:

$$\begin{vmatrix} 1 & 0 & 0 \\ 0 & 1 & 0 \\ 0 & 0 & 1 \end{vmatrix} \begin{vmatrix} Xr \\ Yr \\ Zr \end{vmatrix} = \begin{vmatrix} Xo \\ Yo \\ Zo \end{vmatrix} \quad (2)$$

or in matrix form:

$$Ax=b \quad (3)$$

Once the problem is posed as in equation (2), it can be regarded as a trivial linear inverse problem. The inverse of the matrix A in equation (3), which is the identity matrix, is also the identity matrix. However in some cases the situation will not be this simple but is more likely to be:

$$\begin{vmatrix} E & 0 & 0 \\ 0 & F & 0 \\ 0 & 0 & G \end{vmatrix} \begin{vmatrix} Xr \\ Yr \\ Zr \end{vmatrix} = \begin{vmatrix} Xo \\ Yo \\ Zo \end{vmatrix} \quad (4)$$

where E, F and G are unknown although they are likely to be around one (or minus one if the detector is wired incorrectly). It can be seen that if E, F and G are not all unity, the inverse of the matrix A is not the identity matrix. For the tetrahedral four-sensor detector configuration, the situation is different. Now the linear inverse problem is over-determined, as there are four equations and only three unknowns. The equation can be written as:

$$\begin{vmatrix} 0. & 0. & 1. \\ 0. & 0.942809 & -0.33333 \\ 0.816496 & -0.471404 & -0.33333 \\ -0.816496 & -0.471404 & -0.33333 \end{vmatrix} \begin{vmatrix} Xr \\ Yr \\ Zr \end{vmatrix} = \begin{vmatrix} Ao \\ Bo \\ Co \\ Do \end{vmatrix} \quad (5)$$

In equation (5) it can be seen that there are four observations (Ao, Bo, Co and Do) and three unknowns (Xr, Yr and Zr). The system is over-determined and as well as producing an estimate of the three unknowns, an estimate of the uncertainty (or error) can also be calculated.

Solving equation (5) using the generalised inverse (Menke, 1981) gives:

$$\begin{vmatrix} Xr \\ Yr \\ Zr \end{vmatrix} = \begin{vmatrix} 0. & 0. & 0.70710 & -070710 \\ 0. & 0.81649 & -0.40824 & -0.40824 \\ 0.86602 & -0.28867 & -0.28867 & -0.28867 \end{vmatrix} \begin{vmatrix} Ao \\ Bo \\ Co \\ Do \end{vmatrix} \quad (6)$$

The singular value decomposition (SVD) method is used to derive condition number and singular values for equation (5). Properties of the matrix which are worthy of note are that, as with equation (2), the condition number is 1.0 but now the singular values are all 1.1547 rather than 1. This means that the final least squares estimates of Xr, Yr and Zr are more reliable than the individual measurements. The uncertainty in the values is reduced by a factor of 1.15.

One Sensor Failure

The effect of a single sensor failing for the case of the three- and four-sensor configurations is now considered. For the three-sensor orthogonal configuration, the failure of a single sensor means that the 3D particle motion is lost. However, this is not the case for the four-sensor tetrahedral configuration. Considering equation (5), if to be concrete we let the receiver D fail, Equation (5) can now be written as:

Active components:

$$\begin{vmatrix} 0. & 0. & 0. \\ 0. & 0.942809 & -0.33333 \\ -.816496 & -0.471404 & -0.33333 \end{vmatrix} \begin{vmatrix} Xr \\ Yr \\ Zr \end{vmatrix} = \begin{vmatrix} Ao \\ Bo \\ Co \end{vmatrix} \quad (7)$$

Failed component:

$$-0.816496 - 0.471404 - 0.333333 \, Do$$

The three by three matrix A now has the generalised inverse $$\begin{vmatrix} 0.707106 & -0.707106 & 0. \\ 0.498248 & 0.408248 & -0.816497 \\ 0.577350 & 0.577350 & 0.577350 \end{vmatrix} \quad (8)$$

The very existence of (8) means that the 3D particle motion can be reconstructed even when any one of the four sensors fails. For the tetrahedral configuration with one failed sensor, one of the singular values is reduced to 0.577 and the condition number increases to 2. The uncertainty in the estimated signal is now increased by 1.732. In other words, the estimated uncertainty is now twice that of the full tetrahedral configuration.

Four Component Coherence

As has been shown in the previous section, the four-sensor configuration means that,the signal estimate of the 3D particle motion is a least squares estimate and the results form an over-determined system of equations. Incoherent and coherent signals can be distinguished from each other. This means that, for the four-sensor configuration, a residual, or misfit, can also be calculated. If all the signals of all the sensors agree, then this misfit will be zero. This ideal is approached when all the sensors are working properly and a strong signal is detected on all the sensors, i.e. the signal to noise ratio is high. If, on the other hand, only random signals are detected on the four sensors or a sensor does not work correctly, then the misfit or residual will not be zero. Thus the normalised misfit, or one minus the normalised misfit, which is here termed 4CC coherency, is a useful measure of signal quality. The over-determined nature of the configuration can therefore be used to distinguish between incoherent and coherent signals.

In matrix form we write:

$$\hat{x} = (A^t A)^{-1} A^t b \quad (9)$$

where the matrices are as defined in equation (5), then:

$$e = b - \hat{b} \quad (10)$$

where $\hat{b}$ is the expected value resulting form the least squares estimate. Substituting into (7) gives:

$$e = b - A\hat{x} \quad (11)$$

$$e = b - A(A^t A)^{-1} A^t b \quad (12)$$

$$e = (I - A(A^t A)^{-1} A^t) b \quad (13)$$

which simplifies to:

$$e = \begin{vmatrix} 0.25 & 0.25 & 0.25 & 0.25 \\ 0.25 & 0.25 & 0.25 & 0.25 \\ 0.25 & 0.25 & 0.25 & 0.25 \\ 0.25 & 0.25 & 0.25 & 0.25 \end{vmatrix} b \quad (14)$$

It can be seen that the misfit is simply calculated by just adding the four recorded signals. The 4CC for the $n^{th}$ sample is then defined as:

$$4CC(n) = 1 - e(n)/b(n) \quad (15)$$

Some examples of 4CC and its uses will now be illustrated.

Figure 2:
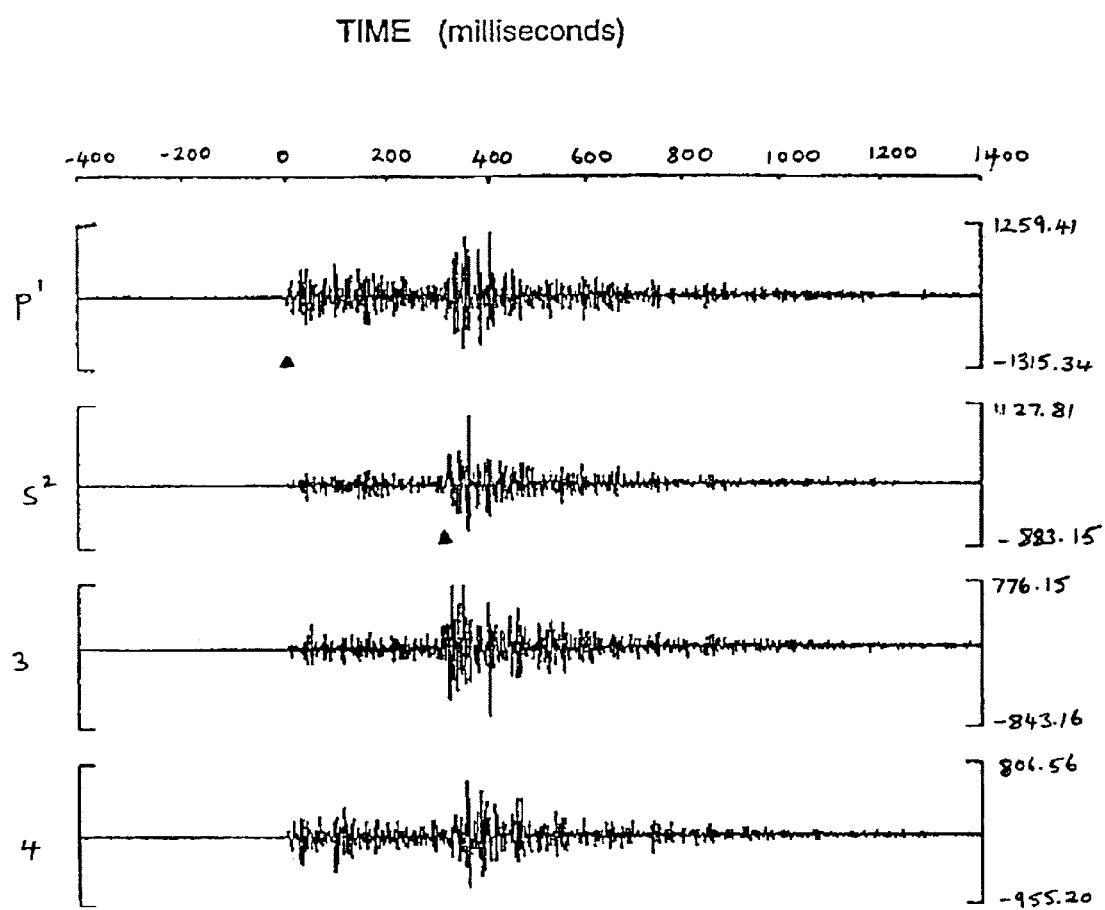
FIG. 2 is a display of data representing a typical microseismic event.
Figure 3:
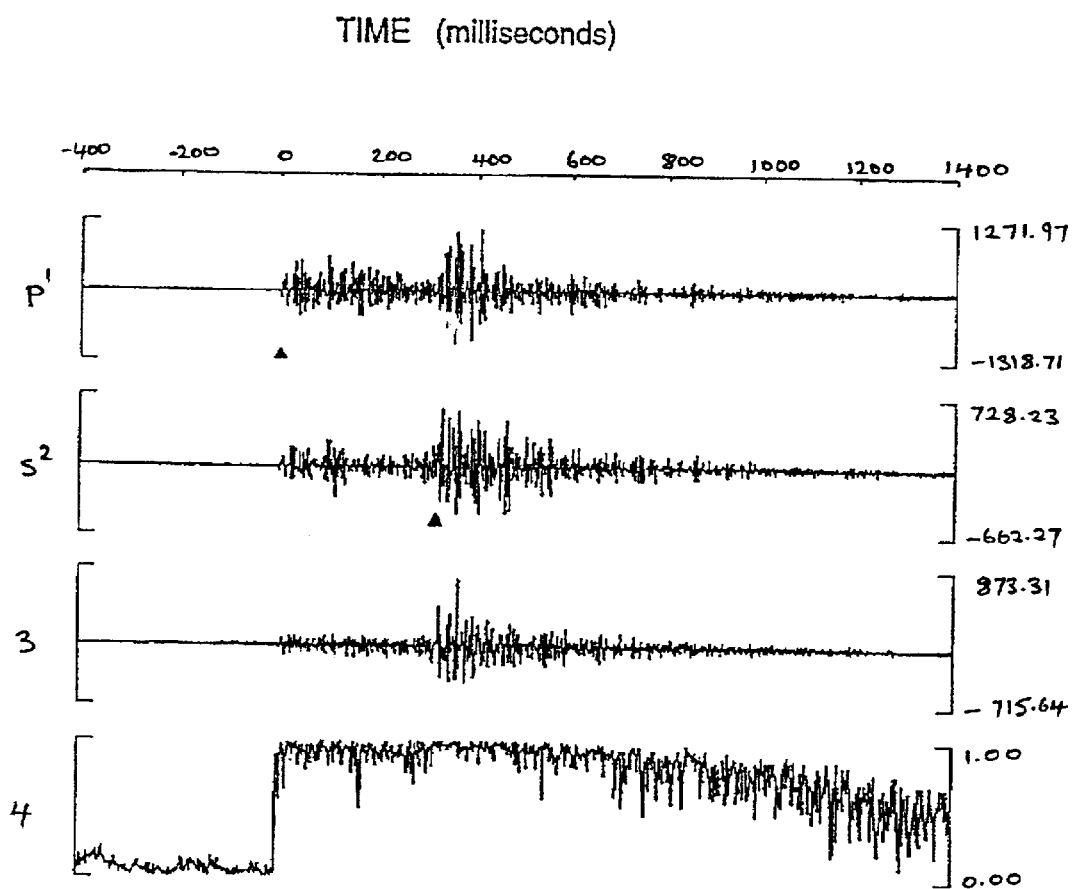
FIG. 3 is a display of the same data as FIG. 2, after the transformation of four sensor data to provide three orthogonal traces.

FIG. 2 shows a typical microseismic event. The time scale is in milliseconds and the amplitudes are given in micro-g. Clear p-wave and s-wave arrival can be seen in FIG. 2 and are marked by upward pointing triangles below the traces. FIG. 3 shows the same data as FIG. 2 but now the four-sensor data has been transformed using equation (5) to give three orthogonal traces and the bottom trace is now the 4CC as defined by equation (1 5). Several features of the coherency are worth comment. The 4CC increases from around zero to one at the point the p-wave arrives. Thus 4CC can be used to help in accurate phase detection. The 4CC can be seen to reduce gradually toward the end of the trace, this giving some measure of the signal to noise ratio of the signal.

Figure 4:
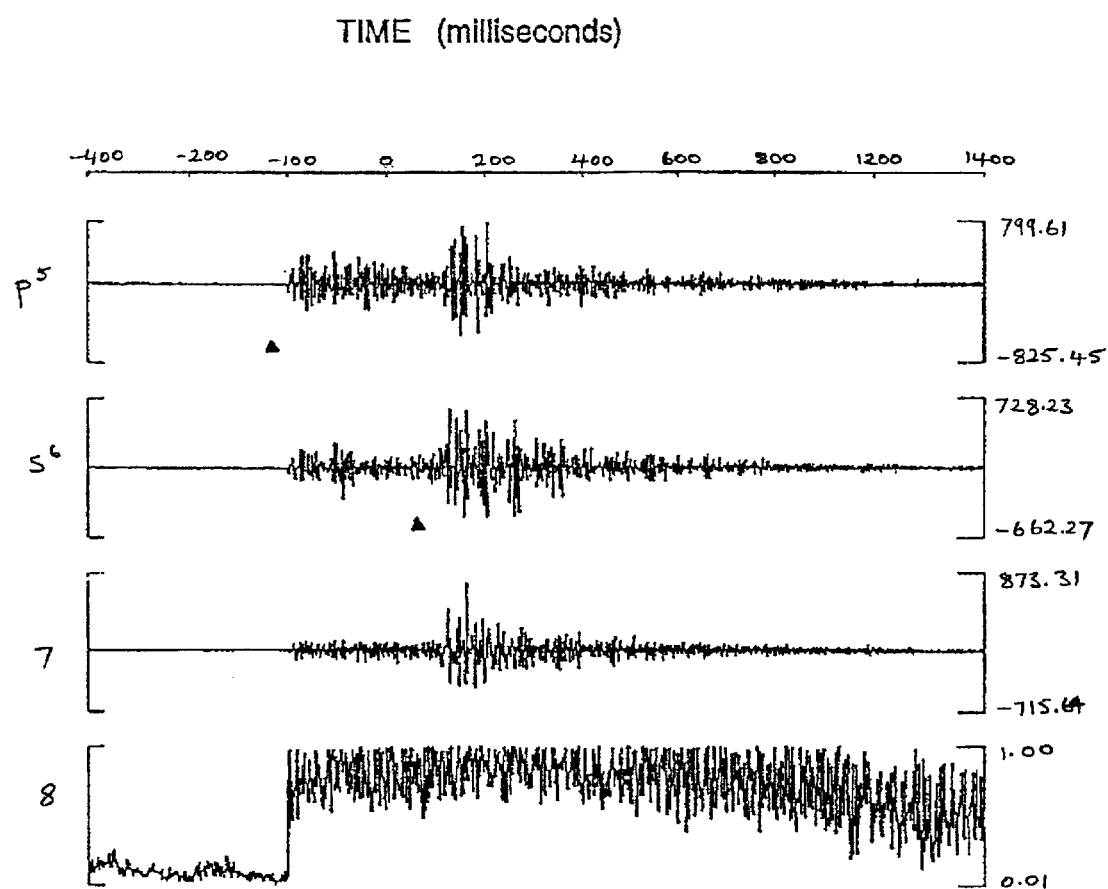
FIG. 4 is a display of the same data as FIG. 2, except that the vertical signal has been halved before the transformation was performed.

FIG. 4 shows the same data as FIG. 2 but now the signal on the vertical has been halved before the transformation was performed. Comparison of the bottom trace on FIGS. 3 and 4 show the effect this gain mismatch has on the 4CC. The analyst is alerted to the fact that the data are not within calibration, which stops the data being misinterpreted, e.g. polarisation analysis would produce erroneous direction estimates.

Figure 5:
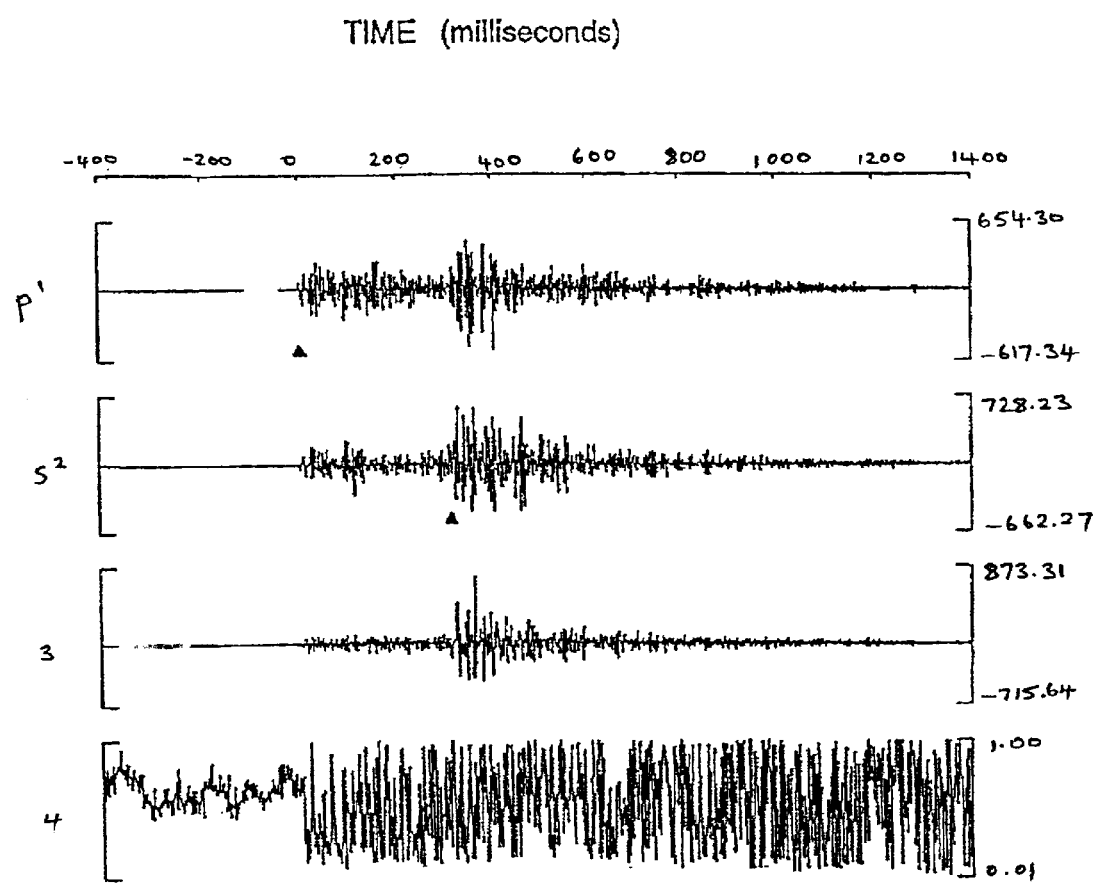
FIG. 5 is a display of data similar to that shown in FIG. 4, where the polarity of the vertical has been changed.

FIG. 5 shows a similar case to that illustrated in FIG. 4 but now the polarity of the vertical has been changed. This is the same as multiplying the gain by minus one. Again, the effect on the 4CC is easily seen and corrective action can be taken.

Gain Recovery

It is a property of the tetrahedral four-sensor configuration that, at any given time, the sum of the signals on the four sensors equals zero (Equation 5) when the signal is coherent, i.e. when the signal to noise ratio is large. This provides a useful way of checking the performance of the system and recovering the gains or sensitivities of the sensor channels if they have changed from their initial values.

A simple set of linear equations can be set up for a trace with the four fixed but unknown gains (G1, G2, G3 and G4) of the sensor channels for samples 1, 2, 3, 4, etc. written as:

$$\begin{vmatrix} A1 & B1 & C1 & D1 \\ A2 & B2 & C2 & D2 \\ A3 & B3 & C3 & D3 \\ A4 & B4 & C4 & D4 \\ A5 & B5 & C5 & C5 \\ A6 & B6 & C6 & D6 \\ & \cdots & & \\ An & Bn & Cn & Dn \end{vmatrix} \begin{vmatrix} G1 \\ G2 \\ G3 \\ G4 \end{vmatrix} = 0 \quad (17)$$

for samples 1 to n. This can be re-written in matrix notation as:

$$Ax = 0 \quad (18)$$

where the matrix A consists of the measured traces and x the four fixed but unknown gains or sensitivities.

This system of equations is known as a set of homogeneous equations. Homogeneous equations have either one or two solutions. The first solution, the trivial solution, which always exists is x=0. For the four-sensor configuration, this can be interpreted as the gains all being zero. The second solution, the non-trivial solution, can only exist under the condition that A is rank deficient. For real data, A will not be perfectly rank deficient but may be close to rank deficient. Singular value decomposition can be applied to the matrix A to analyse it. If the matrix A is found to be rank deficient, then the relative gains may be optimally recovered. However, it should be noted that only the relative values of the gains may be recovered. The total gain of the four-sensor channels may be normalised or one gain may be arbitrarily taken as being correct.

Figure 6:
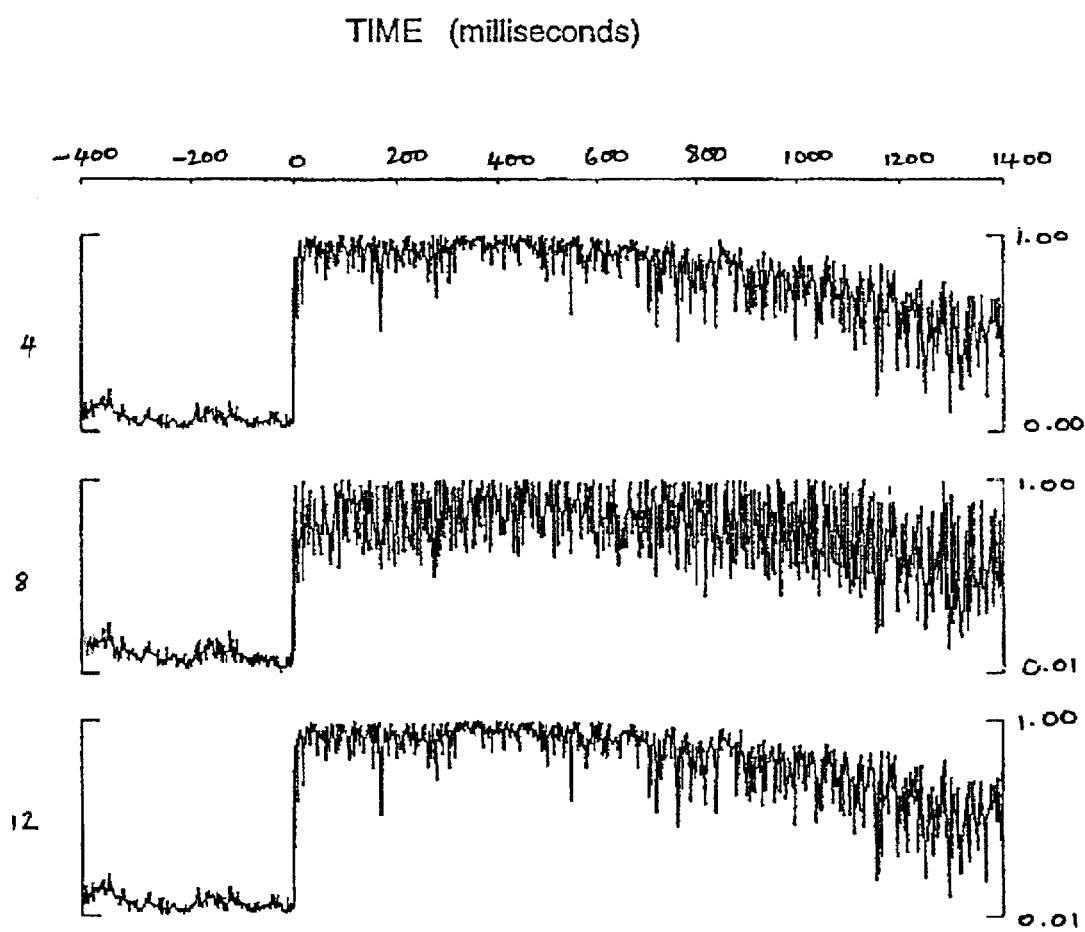
FIG. 6 is a display of data showing application of the gain recovery procedure of the present invention.

Singular value decomposition also has the advantage that the condition number of the matrix A is given and this indicates how close, numerically, the matrix A is to being rank deficient. Not only does the technique allow the recovery of the gains, but the suitability of the data to this type of analysis is also given. Hence if the gains are varying rapidly with time the analysis will show this and stop the user being misled. FIG. 6 shows the application of the gain recovery procedure described in the preceding paragraphs and how it affects the 4CC. The top trace shows the 4CC for the original data. The middle trace shows the 4CC after the gain of one of the traces is halved. The bottom trace shows the 4CC after the application of the gain recovery procedure using the homogeneous equation approach. The gains are recovered to within 5 percent of their original values for these data.

Summary of Process Achievements (1) Sensor redundancy. The configuration is robust and, even if a sensor fails, the full three dimensional particle motion can be recovered.
(2) 4CC allows for signal quality to be assessed objectively and sensor malfunctions to be easily detected.
(3) 4CC aids in the accurate picking of p-wave phases.
(4) Unknown gains or changes in sensitivity can be accurately recovered while the instruments are still in situ and without recording being interrupted.

It is emphasised that the mathematics described above is an illustration only of a method of achieving processing steps according to the invention.

It will be appreciated that the processing steps may be carried out by data processing means using software or by hard-wired logic, for example.

Another aspect of he present invention is the addition to the four-sensor detector of an omni-directional hydrophone to remove the ambiguity of a received wave being in compression or dialation in any seismic event.

What is claimed is:

1. A method of using a seismic detector including four seismic sensors having axes which are in a substantially tetrahedral configuration, to detect and measure seismic activity, each of the sensors being in a respective signal channel, the method including the step of checking the gains of the four channels by taking a plurality of samples from the sensors, constructing a set of simultaneous equations from the samples, and solving the equations to determine the gains of the four channels.

2. A method of using a seismic detector including four seismic sensors having axes which are in a substantially tetrahedral configuration, to detect and measure seismic activity, each of the sensors being in a respective signal channel, the method including the following steps:
a) combining outputs from the sensors to check that their polarities are correct;
b) testing to ascertain if one of the sensors is not working and, if so, using the outputs from the other three sensors to obtain an indication of motion in three dimensions;
c) if all four sensors are working, using their outputs to obtain an indication of motion in three dimensions on a least squares basis;
d) checking that the outputs from the sensors are coherent; and
e) checking the gains of the four channels.

* * * * *